US006867682B2

(12) United States Patent
Reinhardt et al.

(10) Patent No.: US 6,867,682 B2
(45) Date of Patent: *Mar. 15, 2005

(54) CLEAN ROOM SYSTEM

(75) Inventors: Wilhelm Reinhardt, Schorzberg (DE); Helmut Lipp, Hohebach (DE); Hartmut Schneeweiss, Bad Mergentheim (DE); Manfred Renz, Ditzingen (DE)

(73) Assignees: Meissner & Wurst GmbH & Co. Lufttechnische Anlagen Gebäude- und Verfahrenstechnik, Stuttgart (DE); ebm Werke GmbH & Co., Mulfingen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/652,914

(22) Filed: May 17, 1996

(65) Prior Publication Data

US 2003/0011465 A1 Jan. 16, 2003

(30) Foreign Application Priority Data

May 19, 1995 (DE) .......................................... 195 18 445

(51) Int. Cl.[7] .............................................. H04Q 1/00
(52) U.S. Cl. ........................................ 340/3.5; 340/506
(58) Field of Search ....................... 340/825.06, 875.07; 364/472.09, 475.1; 454/51, 62; 165/205, 208, 209; 954/73; 236/49.1; 374/102.05

(56) References Cited

U.S. PATENT DOCUMENTS

| | | | | |
|---|---|---|---|---|
| 4,806,832 A | * | 2/1989 | Muller | 318/334 |
| 4,902,315 A | * | 2/1990 | Spicer | 55/97 |
| 5,039,980 A | * | 8/1991 | Aggers | 340/506 |
| 5,043,722 A | * | 8/1991 | Aggers et al. | 340/825.5 |
| 5,259,812 A | * | 11/1993 | Kleinsek | 454/57 |
| 5,475,364 A | * | 12/1995 | Kenet | 340/522 |
| 5,481,260 A | * | 1/1996 | Buckler et al. | 340/870.09 |
| 5,533,668 A | * | 7/1996 | Erikson | 236/49.3 |
| 5,562,537 A | * | 10/1996 | Zver et al. | 454/61 |
| 5,682,329 A | * | 10/1997 | Seem et al. | 364/551.01 |
| 5,684,469 A | * | 11/1997 | Toms et al. | 340/825.07 |
| 5,801,940 A | * | 9/1998 | Russ et al. | 364/138 |

* cited by examiner

Primary Examiner—Brian Zimmerman
(74) Attorney, Agent, or Firm—Gudrun E. Huckett

(57) ABSTRACT

A clean room system has filter-fan units each having at least one fan motor and being connected to an electric network. At least one central control unit is provided. A connecting bus system for connecting the filter-fan units to one another and to the at least one central control unit is provided.

20 Claims, 2 Drawing Sheets

CLEAN ROOM SYSTEM

BACKGROUND OF THE INVENTION

The present invention relates to a clean room system with filter-fan units which each have at least one fan motor and are connected to an electrical network.

Such clean room systems have filter fan units which are arranged within the ceiling area and which each comprise a fan motor that drives the fan. The fan sucks in clean air and conveys the clean air via a filter downward into the clean room. In the past, alternating current motors have been used as fan motors or rotary current motors with phase control for controlling the respective fans. It is also known to combine individual motors in groups whereby each group is then controlled. The design of such clean room systems with individual fan motors or fan motors that are combined in groups and controlled as a group is expensive and complicated.

It is therefore an object of the present invention to improve a clean room system of the aforementioned kind such that the control of the individual filter fan units is simplified and less expensive.

SUMMARY OF THE INVENTION

The clean room system according to the present invention is primarily characterized by:

Filter-fan units each having at least one fan motor and being connected to an electric network;

At least one central control unit;

A connecting bus system for connecting the filter-fan units to one another and to the at least one central control unit.

Advantageously, the clean room system further comprises a LON network, wherein the bus system is part of the LON network.

Preferably, the clean room system further comprises first connecting nodes, wherein each one of the filter-fan units is connected to the bus system with one of the first connecting nodes.

Expediently, the clean room system further comprises a terminal node, wherein the at least one central control unit is connected with the terminal node to the bus system.

In a preferred embodiment of the present invention, the fan motors are electronically commutated direct current motors.

Preferably, each one of the fan motors comprises a motor control unit and each one of the fan motors is connected to the connecting nodes with the motor control unit.

Advantageously, each one of the motor control units comprises a bridge circuit.

Preferably, each one of the motor control units comprises a first microcontroller.

Preferably, the clean room system further comprises interfaces, wherein each one of the first microcontrollers is connected with one of the interfaces to the connecting nodes.

Each one of the first connecting nodes preferably comprises a second microcontroller.

Advantageously, the second microcontroller is a neuron chip.

In yet another embodiment of the present invention, the clean room system further comprises interface components, wherein each one of the second microcontrollers is connected to the bus system with one of the interface components.

Advantageously each one of the second microcontrollers is connected with the interface components to one of the first microcontrollers.

In a preferred embodiment of the present invention, the clean room system further comprises rectifiers, wherein each one of the fan motors is connected with one of the rectifiers to the electric network.

Preferably, each one of the rectifiers has a voltage regulator.

In a preferred embodiment of the present invention, the at least one central control unit is a hand-held terminal.

Preferably, the clean room system further comprises a multiplexer, wherein the at least one central control unit is connected with the multiplexer to the terminal node.

Expediently, the terminal node comprises a microcontroller and an interface component, wherein the microcontroller is connected with the interface component to the bus system.

In yet another embodiment of the present invention the at least one central control unit is a personal computer.

Advantageously, the bus system comprises a double strand connecting line.

In a preferred embodiment of the present invention, the electric network is a transmission medium between the filter fan units and the at least one central control unit.

Advantageously, the transmission medium between the filter-fan units and the at least one central control unit is in the form of cables selected from the group consisting of infrared cable, fiber glass cable, and coaxial cable.

In the inventive clean room system the filter-fan units are connected via the bus system to one another as well as to the central control unit. With the bus system each filter fan unit can be controlled by the central control unit. Each filter-fan unit has a designated address, respectively, identification number via which the filter-fan unit can be addressed by the central control unit. In this manner, it is also very easily possible to combine a plurality of filter-fan units to any desired group and to operate this group simultaneously. The central control unit then only has to address one filter-fan unit group via its common address or identification number. With the inventive clean room system it is also possible to reprogram at a later time the individual units, i.e., to provide addresses for special fan-filter units of the clean room system. In known blower or fan motors with phase control, it is necessary to switch dip switches at the unit for a new adjustment. This is complicated and time consuming.

The fan motors, for example, can be digitally controlled with a plurality of fixedly preprogrammed rpm settings. With conventional fan motors, the rpm setting must be indirectly controlled via voltage monitoring. For this purpose, for each fan motor a voltage-rpm curve must be produced which is then subsequently used in order to determine the rpm as a function of the voltage. With the inventive embodiment, the rpm can be directly digitally controlled. Via the bus system data or information can be sent from the control unit to the respective filter-fan units. It is also possible to send respective data from the filter-fan unit to the control unit. For example, in a trouble situation, a respective trouble message can be sent from the respective filter-fan unit to the central control unit. Since each filter-fan unit is provided with an address, respectively, identification number, the central control unit can thus simply identify the troubled filter-fan unit.

The central control unit can send new operative data to all or selected filter-fan units. For example, the rpm of the fans can be simply adjusted to achieve individual specifications with regard to the air velocity. With this measure, it is possible in a simple manner to influence the noise behavior. Furthermore, it is possible to change with the central control unit the fans of all or just selected filter-fan units at a preset point in time, for example, for a daytime or nighttime output reduction.

Advantageously, the fan motors are in the form of electronically commutated direct current motors. In contrast to conventional fans operated with alternating current, which are controlled by phase control, this results in a considerable efficiency improvement. Furthermore, this also results in a noise improvement for a pulse width modulated frequency of approximately 20 khz in comparison to phase control with alternating current motors or three phase current motors. The humming noise, which results from phase control and may produce oscillations of the fan housing, will not occur at all upon use of electronically comutated direct current motors or only in negligeable levels.

BRIEF DESCRIPTION OF THE DRAWINGS

The object and advantages of the present invention will appear more clearly from the following specification in conjunction with the accompanying drawings, in which:

FIG. 2 to

DESCRIPTION OF PREFERRED EMBODIMENTS

The present invention will now be described in detail with the aid of several specific embodiments utilizing FIGS. 1 through 4.

Figure 1:
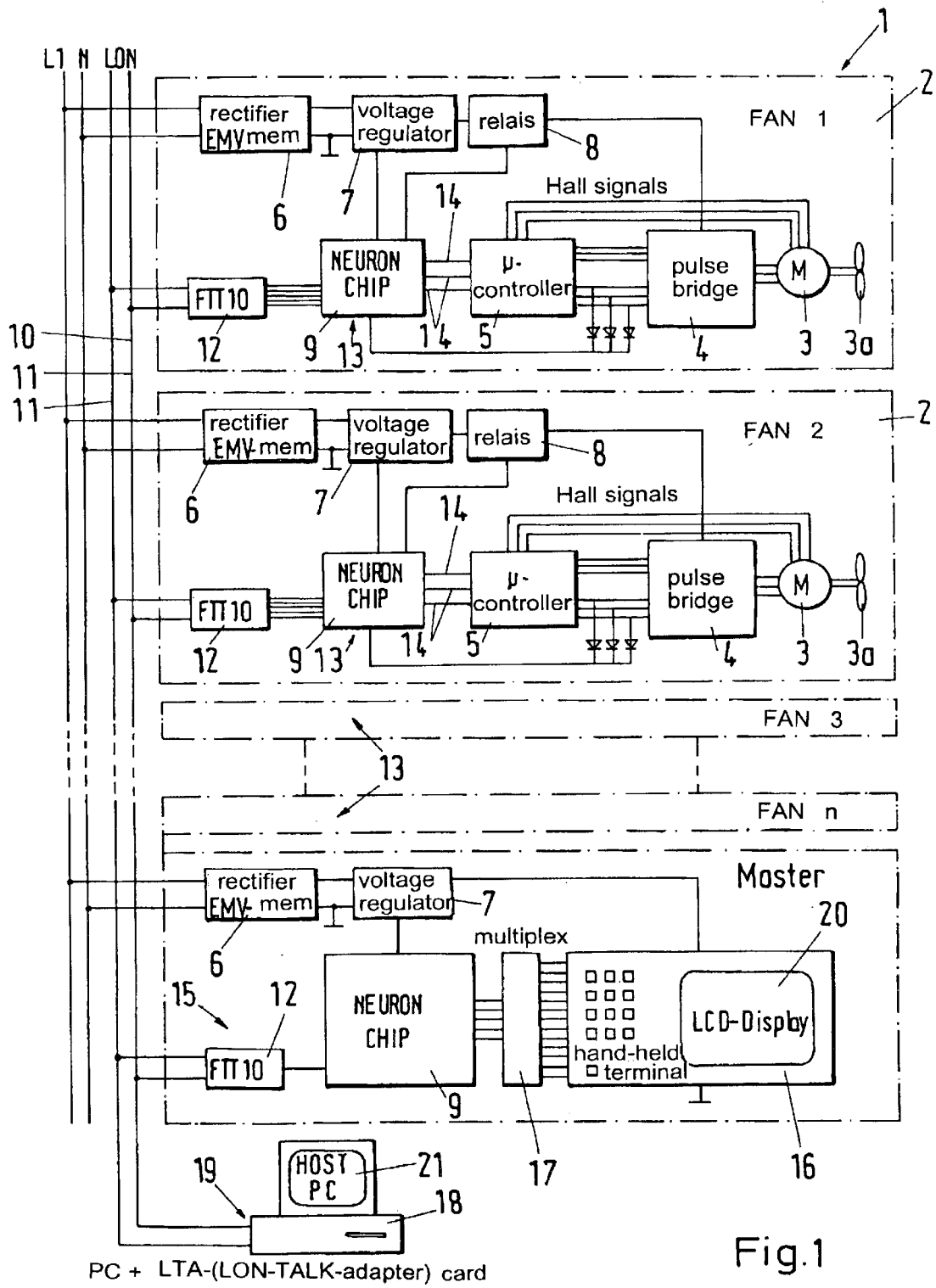
FIG. 1 shows a schematic representation of the inventive system for controlling and monitoring filter-fan units of a clean room system.

The system to be described in the following serves for controlling the ventilation system 1 of a clean room. The ventilation system 1 has, in a manner known per se, filter-fan units 2 arranged within the sealing area of a clean room and suspended from the ceiling of the clean room in a grid pattern. However, it is also possible to support the filter-fan units 2 on the floor or at the sidewalls of the clean room. The filter-fan units 2 each comprise a fan 3a which is driven by a motor 3. The clean air flows through a non-represented filter in the downward direction into the clean room and flows therethrough in a laminar flow. At the bottom of the clean room openings are provided in a manner known per se through which the clean air flows into a return system via which the clean air is returned to the individual filter-fan units. In FIG. 1, the filter fan-unit 2 is schematically represented by a dash-dotted line.

The motor 3 of the filter-fan unit 2 is an electronically commutated direct current motor. Depending on the constructive size of the filter-fan unit 2, one or multi stranded direct current motors are used. In the represented embodiment the motor 3 is a three-strand electronically commutated direct current motor. The three-strand motors 3 are switched in a triangle connection and are supplied with electricity with a six coil-operated bridge circuit 4. When single strand motors are used as direct current motors, the current supply of the motor is realized with an H full bridge circuit.

The bridge circuit 4 has arranged downstream thereof a microcontroller 5. The commutating times of the motor 3 are determined by the output signals of the three Hall sensors, respectively, by the counter electro-motoric force (EMF) which are supplied to the microcontroller 5. The microcontroller 5 delivers the commutating impulses for the motor 3. These commutating impulses are supplied via the bridge circuit 4 to the motor 3.

The supply voltage of the motor 3 is derived from the network voltage L1, N. The network voltage is first transformed into direct current at the rectifier 6, which has connected thereto a voltage regulator 7. The voltage regulator 7 is preferably a power factor controller which maintains the direct current voltage at a constant level and which maintains the harmonic content of the network current at a minimum level so that an power factor of approximately 1 is realized.

The voltage regulator 7 is connected via switch 8 which is preferably a relay, to the bridge circuit 4. When at the filter-fan unit 2 an error occurs, the bridge circuit 4 of the filter-fan unit 2 can be separated from the network L1, N by the switch 8.

The block diagram represented in FIG. 1 of the rectifier 6 comprises also an EMV (electromagnetic compatibility) member, respectively, a filter which reduces possible occurring unacceptably high current and voltage peaks.

The voltage regulator 7 and the switch 8 are connected to a microcontroller 9, preferably, a neuron chip which is a component of the LON network 10. Via this network 10 all filter-fan units 2 are connected to one another. Such LON networks are known and are therefore not described in detail. These networks transmit sensor and control messages. Typically, these messages are very short. They contain command and status information that will trigger certain actions. An LON network may comprise up to 32,768 intelligent nodes which are able to perform every control and monitoring function. A net node is able to make decisions based on the information which is transmitted to it from other nodes. The network nodes of the LON network 10 comprise neuron chips 9 in which the entire LON protocol is integrated. The connection between the actual connecting lines 11 which connect the network nodes to one another and the filter-fan units respectively, the hand-held terminal and/or personal computer connected thereto, is achieved via interface components 12 that provide galvanic separation and furthermore provide for high short circuiting stability up to, for example, 270 volts. The interface component 12 is a transceiver which transforms the signals transmitted to the connecting line 11 of the LON network and guides them to the microcontroller 9.

The microcontroller 9 is connected with the voltage regulator 7, the switch 8, and the microcontroller 5.

The components 4, 5, 6, 7, 8, 9, 12 provide a ventilation connecting node 13 via which the motor 3 is connected to the LON network 10. The ventilation connecting node comprises the motor control 4, 5 in form of the bridge circuit 4 and the microcontroller 5 as well as the digital control within the microcontroller 9. The microcontroller 9 in the form of a neuron chip contains furthermore a communication protocol via which the connection between the LON network 10 and the motor control 4, 5 is realized. The neuron chip 9 is connected via an interface 14 with the microcontroller 5 of the commutating electronic device of the motor 3. The input of the microcontroller 5 is designed such that a separation of motor electronic and LON network 10 is possible. This allows for an exchangeability of different motor types.

The disclosed components 2 through 14 are integrated into the filter-fan unit 2. Each individual filter-fan unit 2 is designed in the same manner including these components and connected to the LON network 10. Therefore, each filter-fan unit 2 can be addressed via the respective ventilation connecting node 13. When the ventilation system 1 contains n filter-fan units 2, n ventilation connecting nodes 13 are thus provided.

A hand-held terminal 16 is furthermore connected to the LON network 10 via a terminal node 15. It serves to start the system and to read and analyze ventilation-specific data of the individual ventilation connecting nodes 13.

The terminal node 15 includes the interface component 12 which produces the connection from the connecting line 11 of the LON network 10 to the neuron chip 9. This microcontroller 9 is connected via a multiplexer 17 to the hand-held terminal 16. The voltage supply of the hand-held terminal 16 as well as of the neuron chip 9 takes place via the rectifier 6 and the voltage regulator 7. The block diagram of the rectifier 6 comprises the EMV member with which possibly occurring unacceptable voltage and current peaks are reduced.

The terminal node 15 comprises expanded protocol functions. In the alternative, or in addition, to the hand-held terminal 16, a personal computer 18 may be provided which is also connected to the LON network 10. The connection between the LON network 10 and the personal computer 18 is realized with a LON talk adapter card which is inserted into the personal computer 18. The personal computer 18 also serves to start the ventilation system 1 and read and analyze ventilation-specific data of the individual connecting nodes 13. The adapter card and the connecting line 11 together form a terminal node (PC node) 19 of the network.

In order to be able to address the individual filter-fan units 2 via the LON bus system, each network connecting node 13, 15, 19 has its own address, respectively, identification number for correlating data. Advantageously, the system is designed such that the address, respectively, identification number can be changed at any time, for example, when the ventilation system 1 is to be expanded or individual units are to be replaced by other units.

For the correlation of data from one node to another node two scenarios must be differentiated. In the first scenario, the same message is to be transmitted from a source node to all target nodes. This is a so-called broadcast message. In the second scenario, special data are transmitted from a source node to selected target nodes. This is a so-called explicit message. This will be explained in more detail with the aid of FIGS. 2 to 4.

Figure 2:
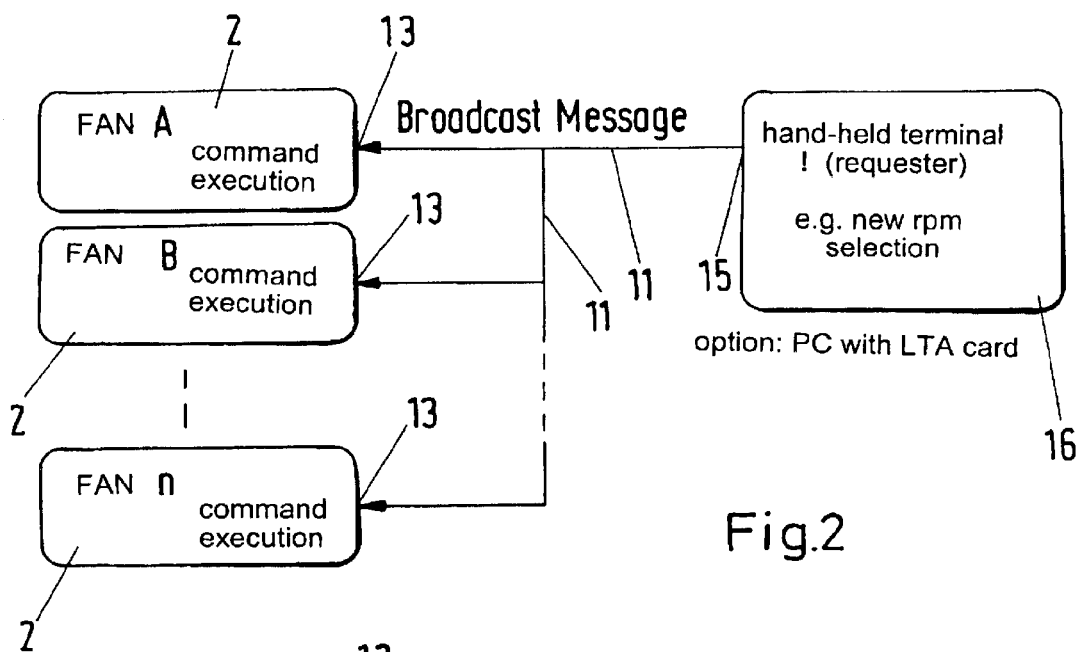

FIG. 2 shows the scenario in which from a source node the same data is to be transmitted to all target nodes. In the represented embodiment, the same data are transmitted from the hand-held terminal 16 to all filter-fan units 2. For example, via the hand-held terminal 16 a desired rpm is input at which all filter-fan units 2 are to be operated. Via the terminal node 15 and the connecting lines 11 the corresponding data are transmitted to the connecting nodes 13 and from there to each individual filter-fan unit 2. In this manner, all filter-fan units 2 are controlled so that they all operate at the same rpm. A further example for a broadcast message is a daytime or nighttime output reduction during operation of the filter-fan units 2. With a programmed clock provided within the hand-held terminal 16 the respective data can be transmitted in the aforedescribed manner in a time-controlled fashion via the network 10 to the individual filter-fan units 2.

Instead of the hand-held terminal 16 it is also possible to transmit the respective data via the personal computer 18 to the respective filter-fan units. In this case, the data are transmitted from the personal computer 18 via the PC node 19 to the individual connecting nodes 13. This data transfer takes place in cases in which all filter-fan units 2 are to be supplied with the same data.

The data transmitted from the source node 15, 19 are transmitted via the interface components 12, the neuron chips 9, and the motor control 4, 5 to the motors 3 which are thus correspondingly controlled.

Figure 3:
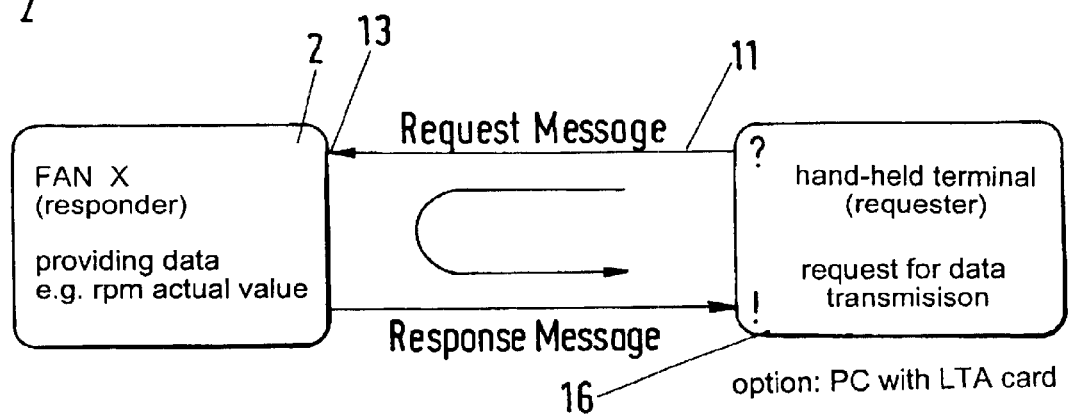
Figure 4:
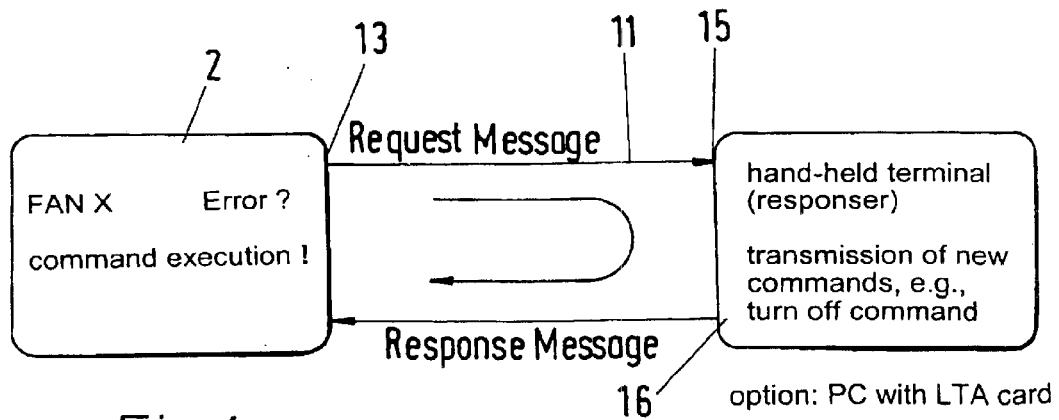
FIG. 4 respectively show a block diagram of different elements of the inventive system.

FIGS. 3 and 4 show two examples of explicit data transmission. In FIG. 3 a scenario is represented in which from the hand-held terminal 16, or also from the personal computer 18, data are sent to selected filter-fan units 2. The respective data are transmitted from the hand-held terminal 16 via the terminal node 15 and the connecting lines 11 of the network 10 to the selected connecting nodes 13. The connecting node 13 is selected by its correlated address, respectively, identification number. This is, for example, necessary when it is desired to change the rpm of selected filter-fan units 2. The filter-fan unit 2 is designed such that, after setting the new rpm of the motor 3, a corresponding return message is sent to the terminal 16 via the network 10. Thus, it is possible that the terminal 16, respectively, the respective program therein can decide positively whether the selected filter-fan unit 2 has reached the desired rpm for the preselected air velocity. If this is not the case, the data are resent from the hand-held terminal 16 to the filter-fan unit 2. Only when the return message sent by the filter-fan unit 2 signals to the hand-held terminal 16 that the new data have been accepted, the data transmission from the hand-held terminal 16 is terminated. If after multiple data transmissions the selected filter-fan unit 2 has not accepted the new data or has not accepted the data in the expected manner, the program within the hand-held terminal 16 is designed such that an error message is released and the data transmission is terminated. The operator can then check where the error occurs.

In the disclosed manner, the new operating data are transmitted from the hand-held terminal 16, respectively, from the personal computer 18 to the selected filter-fan unit.

FIG. 4 shows in an exemplary manner the scenario in which via the connecting node 13 data are transmitted to the hand-held terminal 16, respectively, to the personal computer 18. This is, for example, the case when an error occurs at the respective filter-fan unit 2, for example, when the motor 3 is blocked, the desired rpm cannot be reached, unacceptable high temperatures occur within the unit, the motor 3 has a wrong direction of rotation etc. In this case, the data are transmitted via the connecting node 13, the connecting lines 11 of the LON network 10 and, via the terminal node 15 to the hand-held terminal 16, respectively, via the PC node 19 to the personal computer 18. In this scenario, the handheld terminal 16, respectively, the personal computer 18 are provided with corresponding displays, for example, an LED, which indicates the respective error situation. The hand-held terminal 16, respectively, the personal computer 18 have each a display 20, respectively, 21 (FIG. 1) on which the address of the filter-fan unit 2 where the error occurs as well as the reason for the error is indicated. The operator can then react accordingly to the error message. After the error has been corrected, the repaired unit can be checked from the hand-held terminal, respectively, from the personal computer with respect to its function and operability. The respective error message is then deleted from the display 20 or 21.

However, there is also the possibility, when errors occur, to separate the respective filter-fan unit 2 from the network L1, N via the hand-held terminal 16 or the personal computer 18 by turning off the power supply of the unit 2. In this case, switching via the switch 8 of the corresponding unit 2 is performed. Depending on the cause of the error, an automatic switching can also be performed at the connecting node 13 of the defective filter-fan unit 2. Since each connecting node 13 has its own address or identification number, the defective filter-fan unit can be reliably selected.

When the personal computer 18 is used for communication with the ventilation system 1, on the monitor 21 the respective clean room as well as the ventilation system can be graphically represented. When a filter-fan unit 2 is defective, the graphical display can show which one of the units is the one in question. The operator then knows exactly in which area of the clean room system 1 the defective unit is positioned. In this manner it is very easily and quickly possible to directly access at the right location the defective filter-fan unit 2.

Due to the use of the LON bus system it is also possible to select any desired number of filter-fan units 2 and to combine them to one or more groups which are then controllable together. Thus, a group-wise control of the units 2 in the aforedescribed manner is possible. The combination of various filter-fan units 2 to a group can be performed at any time via the corresponding program of the hand-held terminal 16 or the personal computer 18.

The individual nodes 13, 15, 19 of the network 10 are connected with one another by a two-strand connecting line 11. Instead of this two-strand connecting line 11, it is also possible to use the network line L1, N for data transmission. In this case other transceivers are required which realize the connection to the electric lines.

It is possible to use high frequency transmission lines, coaxial cables, infra red cables or fiber glass cables.

The present invention is, of course, in no way restricted to the specific disclosure of the specification and drawings, but also encompasses any modifications within the scope of the appended claims.

What is claimed is:

1. A clean room comprising: filter-fan units each having at least one fan motor and being connected to an electric network;
   each one of said filter-fan units having a specific address;
   at least one central control unit:
   a LON network comprising a connecting bus system;
   a connecting node for each one of said filter-fan units, wherein each one of said filter-fan units is connected to said bus system by one of said connecting nodes;
   said bus system connecting said filter-fan units to one another and to said at least one control unit;
   wherein said filter-fan units are directly accessed via sold specific address by said at least one central control unit;
   wherein said fan motors are electronically commutated direct current motors;
   wherein each of said connecting nodes has a microcontroller and comprises a motor control of the at least one fan motor of the filter-fan unit;
   wherein said at least one central control unit prescribes desired or rated data that is transmitted to said filter-fan units, wherein monitoring of the desired or rated data is effected by said microcontrollers, which, when a disruption occurs, transmit an error message to said at least one central control unit;
   wherein said LON network is configured such that a communication from said filter-fan units to said at least one control unit is enabled;
   wherein noise produced by said filter fan units is reduced by electronic commutation of said electronically commutated direct current motors at a pulse-width modulated frequency of approximately 20 kHz.

2. A clean room system according to claim 1, further comprising a terminal node, wherein said at least one central control unit is connected with said terminal node to said bus system.

3. A clean room system according to claim 1, wherein said bus system comprises a double strand connecting line.

4. A clean room system according to claim 1, wherein said electric network is a transmission medium between said filter-fan units and said at least one central control unit.

5. A clean room system according to claim 1, wherein as a transmission medium between said filter-fan units and said at least one central control unit cables are used that are selected from the group consisting of infrared cable, optical cable, and coaxial cable.

6. A clean room according to claim 1, wherein each one of said fan motors comprises a motor control unit and wherein each one of said fan motors is connected to said connecting nodes with said motor control unit.

7. A clean room system according to claim 6, wherein each one of said motor control units comprises a bridge circuit.

8. A clean room system according to claim 6, wherein each one of said motor control units comprises a first microcontroller.

9. A clean room system according to claim 8, further comprising interfaces, wherein each one of said first microcontrollers is connected with one of said interfaces to said connecting nodes.

10. A clean mom system according to claim 8, wherein each one of said connecting nodes comprises a second microcontroller.

11. A clean room system according to claim 10, wherein said second microcontroller is a neuron chip.

12. A clean room system according to claim 10, further comprising interface components, wherein each one of said second microcontrollers is connected to said bus system with one of said interface components.

13. A clean room system according to claim 12, wherein each one of said second microcontrollers is connected with said interface components to one of said microcontrollers.

14. A clean room system according to claim 1, further comprising rectifiers, wherein each one of said fan motors is connected with one of said rectifiers to said electric network.

15. A clean room system according to claim 14, wherein each one of said rectifiers has a voltage regulator.

16. A clean room system according to claim 2, wherein said at least one central control unit is a hand-held terminal.

17. A clean room system according to claim 16, further comprising a multiplexer, wherein said at least one central control unit is connected with said multiplexer to said terminal node.

18. A clean room system according to claim 17, wherein said terminal node comprises a microcontroller and an interface component, wherein said microcontroller is connected with said interface component to said bus system.

19. A clean room system according to claim 1, wherein said at least one central control unit is a personal computer.

20. A clean room comprising:
   filter-fan units each having at least one fan motor and being connected to an electric network;
   each one of said filter-fan units having a specific address;
   at least one central control unit;
   a LON network comprising a connecting bus system;

a connecting node for each one of said filter-fan units, wherein each one of said filter-fan units is connected to said bus system by one of said connecting nodes;

said bus system connecting said filter-fan units to one another and to said at least one control unit;

wherein said filter-fan units are directly accessed via said specific address by said at least one central control unit;

wherein said fan motors are electronically commutated direct current motors;

wherein each of said connecting nodes has a microcontroller and comprises a motor control of the at least one fan motor of the filter-fan unit;

wherein said at least one central control unit prescribes desired or rated data that is transmitted to said filter-fan units, wherein monitoring of the desired or rated data is effected by said microcontrollers, which, when a disruption occurs, transmit an error message to said at least one central control unit;

wherein said LON network is configured such that the connecting nodes of said filter-fan units are configured to operate as a requester and a responder, respectively;

wherein noise produced by said filter fan units is reduced by electronic commutation of said electronically commutated direct current motors at a pulse-width modulated frequency of approximately 20 kHz.

* * * * *